(12) United States Patent
Will et al.

(10) Patent No.: US 9,396,645 B2
(45) Date of Patent: Jul. 19, 2016

(54) SYSTEMS AND METHODS FOR AUTOMATED PERSONAL EMERGENCY RESPONSES

(71) Applicants: Travis E. Will, Renton, WA (US); Russell E. VanDevanter, Seattle, WA (US); Steven M. Myhre, Seattle, WA (US); Michael J. Myhre, Monroe, WA (US)

(72) Inventors: Travis E. Will, Renton, WA (US); Russell E. VanDevanter, Seattle, WA (US); Steven M. Myhre, Seattle, WA (US); Michael J. Myhre, Monroe, WA (US)

(73) Assignee: ROCKWILLI RMR LLC, Renton, WA (US)

(*) Notice: Subject to any disclaimer, the term of this patent is extended or adjusted under 35 U.S.C. 154(b) by 336 days.

(21) Appl. No.: 13/942,833

(22) Filed: Jul. 16, 2013

(65) Prior Publication Data

US 2015/0022342 A1    Jan. 22, 2015

(51) Int. Cl.
| | |
|---|---|
| *G08B 19/00* | (2006.01) |
| *G08B 25/01* | (2006.01) |
| *H04M 3/51* | (2006.01) |
| *H04M 1/00* | (2006.01) |
| *H04L 1/00* | (2006.01) |
| *H04M 1/725* | (2006.01) |
| *H04M 3/46* | (2006.01) |
| *H04M 3/56* | (2006.01) |

(52) U.S. Cl.
CPC ........... *G08B 25/016* (2013.01); *H04M 3/5116* (2013.01); *H04L 1/00* (2013.01); *H04M 1/00* (2013.01); *H04M 1/72536* (2013.01); *H04M 3/46* (2013.01); *H04M 3/56* (2013.01)

(58) Field of Classification Search
CPC ................................. H04M 1/00; H04L 1/00
See application file for complete search history.

(56) References Cited

U.S. PATENT DOCUMENTS

| | | | | |
|---|---|---|---|---|
| 2002/0044682 | A1* | 4/2002 | Weil | G06T 7/004 382/154 |
| 2012/0327175 | A1* | 12/2012 | Couse | H04L 12/1818 348/14.08 |
| 2015/0208222 | A1* | 7/2015 | Dalton | A61B 5/1112 455/404.2 |

* cited by examiner

*Primary Examiner* — Shirley Lu
(74) *Attorney, Agent, or Firm* — Puget Patent; Michael Gibbons

(57) ABSTRACT

A personal emergency response system implemented as a conference bridge on a remote computing network. Upon receiving an alert from an individual in need of aid, a conference including audio and/or video connection is established. A predetermined list of parties is coupled to the conference, including friends, caregivers, medical professionals, emergency responders and others as stored in a configuration database specific to the individual via a web interface. The database record may also contain vital information about the individual, in additional to demographic data, location information, history and other factual information. Medical telemetry may be obtained in real-time and disseminated among the conference participants. Other parties may be dynamically joined to the conference as needed upon a conference participant utilizing DTMF codes or other means to request the others to join.

13 Claims, 5 Drawing Sheets

| Alarm Event | Response(s) | Contact Person(s) |
| --- | --- | --- |
| Emergency | 1. Initiate Conference Network | 1. Emergency Dispatch |
| Fall Detector | 1. Interact With Subscriber Device;<br>2. If "OK" Status Confirmed, Conclude Alarm Event; Else, Initiate Conference Network. | 1. Caretaker;<br>2. If No Response, First Family Member;<br>3. If No Response, Emergency Dispatch. |
| Frightened | 1. Initaite Conference Network | 1. First Family Member and Caretaker;<br>2. If No Response, Emergency Dispatch. |
| Health Concern | 1. Initiate Conference Network. | 1. Caretaker;<br>2. If No Response, Primary Care Doctor;<br>3. If No Response, First Family Member. |
| Locked Out of House | 1. Interact with Auxiliary Device;<br>2. If Unlock Successful, Conclude Alarm Event; Else, Initiate Conference Network. | 1. Property Manager;<br>2. If No Response, Neighbor;<br>3. If No Response, First Family Member;<br>4. If No Response, Control Center. |
| Need Directions | 1. Instruct Device to Navigate to a Waypoint;<br>2. If Navigation Successful, Conclude Alarm Event; Else,<br>Initiate Conference Network. | 1. First Family Member;<br>2. If No Response, Second Family Member;<br>3. If No Response, Control Center. |
| Need Transportation | Initiate Conference Network. | 1. First Family Member;<br>2. If No Response, Second Family Member;<br>3. If No Response, Control Center. |
| Smoke Alarm | 1. Send Status Check to Auxiliary Device.<br>2. If "OK" Status Confirmed, Conclude Alarm Event; Else, Initiate Conference Network. | 1. Emergency Dispatch |
| Vital Sign Monitor | 1. Initiate Conference Network | 1. Caretaker and Emergency Dispatch. |

FIG. 2

SYSTEMS AND METHODS FOR AUTOMATED PERSONAL EMERGENCY RESPONSES

FIELD OF THE INVENTION

The present disclosure relates generally to personal emergency response systems, and more specifically, to automated personal emergency response systems, methods for responding to personal emergency response system alarm events, and methods for managing care for subscribers to a personal emergency response system.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Personal emergency response systems are alarm systems designed to summon emergency medical personnel in the event of an emergency. Elderly people and disabled people who live alone commonly use personal emergency response systems. Personal emergency response systems are typically monitored by a central control center. Users typically must subscribe to services offered by personal emergency response system monitoring service providers.

In cases of emergency, such as after a fall or a suddenly appearing ailment, a subscriber of a personal emergency response system can trigger an alarm event by pressing a button on a subscriber device. Typical subscriber devices include pendants worn around the neck, wristbands, or other devices that are carried by a subscriber. The device typically has a wireless transmitter that can be activated by the subscriber in the event of an emergency.

In some systems, when an alarm event is triggered, the transmitter sends an alarm to a central monitoring station. Medical personnel are then dispatched to the site where the alarm was activated. In other systems, there is no central monitoring system, and the subscriber simply programs the numbers of family members, neighbors, or local emergency responders.

Monitoring services for personal emergency response systems generally consist of a call center staffed by trained professionals. These professionals are available at all times to receive calls. Some monitoring services employ trained medical staff as call center operators, which enables the monitoring service to better evaluate a subscriber's medical requests. Monitoring services can be quite expensive, thereby driving up the cost of subscribing to a personal emergency response system.

Some personal emergency response systems are used not only for emergencies, but also as a means to conveniently ask questions about concerning symptoms, or for help with day-to-day activities such as shopping, cleaning, or to arrange for transportation.

Those skilled in the art will appreciate that personal emergency response systems can be used for a multitude of applications. However, the cost of monitoring services can limit the scope of services offered. There exists, therefore, a need for a more cost effective means for providing comprehensive personal emergency response system services. Additionally, there exists a need for a personal emergency response system that recognizes various types of alarm events and directs the various alarm events to the appropriate party or parties.

Those skilled in the art will further appreciate that access to information about a subscriber and the subscriber's health conditions can enable medical professionals, caregivers, family members, and emergency response teams to be more responsive a given situation. Despite advances in technology, personal medical information tends to be fragmented among several parties. This is especially true for medical information that is not formally documented. For example, friends, family members, or caregivers may acquire an intimate awareness of a person's medical history based on an accumulation of knowledge over a period of ongoing interactions. Other medical professionals may not have access to this information unless there is an opportunity to converse directly with such friends, family members, or caregivers. Similarly, medical professionals have knowledge and information that could benefit or improve the effectiveness of the day-to-day care activities provided by such friends, family members, or caregivers. Furthermore, information can be obtained from various auxiliary devices used to monitor the health status of a patient or environmental factors around the patient's residence. This information, however, is not readily accessible by parties in remote locations. Given these shortcomings, there exists a need for a personal emergency response system that enables the sharing of information in order to help personal emergency response system responders to be more responsive to various situations in which personal emergency response systems can be used.

These and other problems concerning personal emergency response systems represent long-felt yet unmet needs. Therefore, systems and methods for solving the aforementioned problems are desirable. The embodiments disclosed herein have the potential to provide meaningful benefits to subscribers of personal emergency response systems, health care providers, physicians, insurance companies, emergency dispatch centers, and personal emergency response system service providers.

SUMMARY

A summary of certain embodiments disclosed herein is set forth below. It should be understood that these aspects are presented merely to provide the reader with a brief summary of these certain embodiments and that these aspects are not intended to limit the scope of this disclosure.

Embodiments of the present disclosure relate generally to personal emergency response systems, and more specifically, to automated personal emergency response systems, methods for responding to personal emergency response system alarm events, and methods for managing care for subscribers to a personal emergency response system.

In some embodiments, an automated personal emergency response system comprises an alarm server, a response server, and a data warehouse. The alarm server may be configured to detect alarm events from one or more subscriber devices, to ascertain the nature of an alarm event based on a plurality of alarm event types, and to trigger one or more responses to an alarm event.

In a preferred embodiment, the response server is configured to allow two-way communications and data transmissions among one or more parties and a subscriber device. In some embodiments, the personal emergency response system is configured to enable remotely interacting with one or more auxiliary devices.

In some embodiments, the personal emergency response system is configured to ascertain a class of one or more parties based on the nature of the alarm event, and to give notice to the one or more parties, the notice comprising instructions to join a conference network.

In some embodiments, a computer-implemented method for responding to a personal emergency response system alarm event comprises detecting an alarm event from a subscriber device, ascertaining the nature of the alarm event based on a plurality of alarm event types, and triggering one or more responses to the alarm event. In a preferred embodiment, the one or more responses depend on the nature of the alarm event.

In some embodiments, a computer-implemented method for managing care for a subscriber of a personal emergency response system comprises registering a subscriber device that is configured to enable two-way communications and data transmissions among one or more parties and the subscriber device, designating a plurality of alarm event types, and designating for each alarm event type, one or more responses to be triggered when an alarm event is detected, the one or more responses depending on the nature of the alarm event.

In addition to the foregoing, various other methods, systems, and non-transitory computer-readable media are set forth and described in the teachings of the present disclosure.

The foregoing summary may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings, claims, and the following detailed description.

DESCRIPTION OF THE DRAWINGS

FIG. 2 shows a table detailing one embodiment of various responses to various personal emergency response system alarm events.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
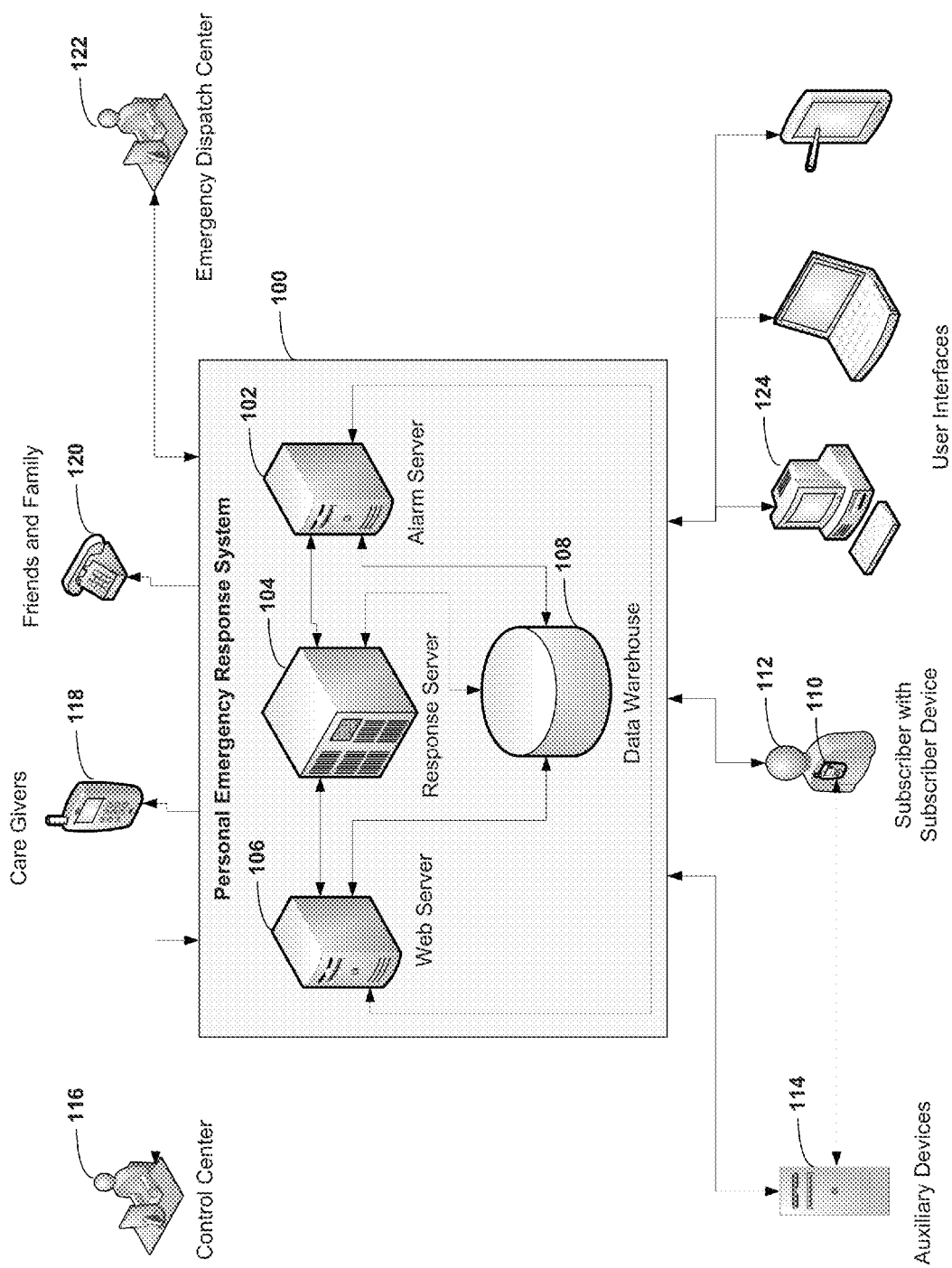
FIG. 1 shows an exemplary embodiment of a personal emergency response system.

FIG. 1 shows an exemplary embodiment of a personal emergency response system 100. Those skilled in the art will appreciate that numerous other embodiments of personal emergency response systems are within the spirit and scope of the disclosure herein.

The embodiment shown in FIG. 1 comprises an alarm server 102, a response server 104, a web server 106, and a data warehouse 108. The alarm server 102, the response server 104, and the web server 106 may be configured to interact with the data warehouse 108, and with one another.

The personal emergency response system 100 is configured to interact with subscriber devices 110 worn or carried by subscribers 112. A subscriber device may be a handheld mobile cellular, personal communication service, or other wireless communications device. In a preferred embodiment, a single dedicated button on the subscriber device may be used to alert the personal emergency response system of the occurrence of an alarm event. The subscriber device may also have a plurality of buttons, with different buttons configured to trigger different alarm events. In some embodiments, the subscriber device is configured to automatically trigger an alarm event. For example, the subscriber device may trigger an alarm event upon the occurrence of a specified condition. In some embodiments, a subscriber device may be equipped with one or more sensors which may be configured to trigger alarm events.

In some embodiments, a subscriber device may have a visual display screen that may be configured to enable tactile or touch-screen interactions with various menu options. In some embodiments, a subscriber device may be configured to enable a subscriber to interact with the subscriber device through audible voice prompts. For example, a subscriber device may be configured to allow a subscriber to initiate an alarm event simply by calling out the word "HELP!" or by calling out some other word associated with an alarm event. Even if the subscriber device is not connected to the personal emergency response system at the time of an audible voice prompt, the subscriber device may be configured to automatically establish a connection, trigger an alarm event, and transmit data to the personal emergency response system, including the content of the audible voice prompt and contemporaneous audio. In some embodiments, a subscriber device may be equipped with video communications functionalities such that a subscriber may engage in video conferencing with other parties. Video conferencing may be initiated upon the occurrence of an alarm event, or parties initiate video conferencing with a subscriber to check-in or casually communicate with the subscriber. Since many subscribers of personal emergency response systems are elderly and may have difficulty hearing or seeing, it is advantageous to provide subscriber devices having visual and audible methods of interacting.

In a preferred embodiment of the personal emergency response system 100, the alarm server 102 is configured to detect alarm events from one or more subscriber devices 110, to ascertain the nature of an alarm event based on a plurality of alarm event types, and to trigger one or more responses to an alarm event. In a preferred embodiment, the responses triggered by the alarm server 102 depend on the nature of the alarm event. In a preferred embodiment, no human operator is needed to detect an alarm event and trigger responses to the alarm event. Those skilled in the art will recognize that the alarm server may be connected to a subscriber device using mobile cellular, personal communication service, web-based wireless network, or other wireless communications technologies. In some embodiments, a continuous connection may be maintained between the alarm server and a subscriber device. This may be advantageous in situation where continuous, real-time monitoring is desirable, for example, where a subscriber suffers from a physical or mental health condition that should not go unmonitored. In alternative embodiments, a connection between the alarm server and a subscriber device may be periodic or intermittent. In situations where continuous monitoring is infeasible, expensive, or unnecessary, periodic or intermittent connections between the alarm server and a subscriber device may be appropriate.

In a preferred embodiment, the personal emergency response system 100 is configured to receive data transmitted from subscriber devices. The data may be recorded and stored in the data warehouse 108. Data may be continuously or intermittently transmitted from subscriber devices. Data transmitted from subscriber devices may include configuration information, subscriber status information, such as GPS location or "safety switch" check-ins, and may also include information associated with an auxiliary device.

Recording functionalities may be incorporated into a subscriber device, or data transmitted from the subscriber device may be recorded at the personal emergency response system. The connections between the personal emergency response system and the subscriber devices, whether continuous or intermittent, facilitate the recording and storing of data. In an alternative embodiment, a connection between the personal emergency response system and a subscriber device may be established via a local network with an internet connection, thereby enabling data to be transmitted from the subscriber device and stored in the data warehouse 108. In some embodiments, the web server 106 may enable the connection between the personal emergency response system and a subscriber device.

In the embodiment of the personal emergency response system 100 shown in FIG. 1, the response server 104 is configured to carry out one or more responses to an alarm event. In some embodiments, the alarm server 102 triggers the response server 104 to carry out responses to an alarm event. Those skilled in the art will appreciate that the alarm server 102 and the response server 104 may be configured to interact with one another via computer program functionalities.

In some embodiments, upon the occurrence of an alarm event the personal emergency response system is configured to give notice to one or more parties to join a conference network. The one or more parties may be pre-defined, and may vary depending on the nature of the alarm event. The notice to join a conference network may be provided by telephone call, automated voice messaging, text message, e-mail, or similar means. Once one or more parties join the conference network, in a preferred embodiment, the response server 104 is configured to allow two-way communications and data transmissions among one or more parties and a subscriber device 110. Two-way communications may be facilitated among multiple parties using a private branch exchange, telephone trunk conference bridge, or other telephone exchange or network. These technologies are advantageous because they enable multiple parties to each talk and listen to one another. In some embodiments, some or all of the parties to the conference network may be able to mute one another or perform other in-conference functionalities.

In various embodiments, the parties that may be included in a conference network comprise a control center 116, or control center personnel, such as the type which provides monitoring services for the personal emergency response system; care givers 118, such as those which provide subscribers 110 with day-to-day care, as well as primary care doctors and other medical service providers; friends and family 120, including neighbors, immediate family members, or close friends that a subscriber 112 tends to rely on for addressing various needs and concerns; and an emergency dispatch center, such as a 911 dispatch center, public safety answering point, or public safety access point. In a preferred embodiment, an emergency dispatch center 122 will be staffed with operators trained to obtain relevant information from callers necessary to dispatch appropriate emergency services. Those skilled in the art will appreciate that in addition to the aforementioned parties, the personal emergency response system 100 of FIG. 1 may be configured to allow two-way communications and data transmissions among a multitude of other parties.

In a preferred embodiment, the personal emergency response system 100 includes audio recording functionalities. Audio may be recorded from the subscriber device, including the subscriber's voice and surrounding sounds, as well as the audio from any of the parties that join the conference network. In some embodiments, audio is recorded from the moment an alarm event is triggered and continuing until the conclusion of the alarm event.

The embodiment of the personal emergency response system 100 shown in FIG. 1 is also configured to remotely interact with one or more auxiliary device 114. Auxiliary devices may include healthcare systems and devices, home automation systems and devices, and other systems and devices that may be used by a subscriber or provided to a subscriber by a care provider, friend or family member, or personal emergency response system service provider in order to improve the level of monitoring services provided to the subscriber or to integrate the services provided to the subscriber with other complimentary services. Healthcare systems and devices may include glucose monitors, dosimeters, heart monitors, wave form monitors, pacemakers, oximeters, blood glucose monitors, and other systems and devices for monitoring a subscriber's vital signs and health status. Home automation systems and devices may include alarm systems, automatic door locks, automatic outlets, and climate control systems and devices.

Interactions with an auxiliary device may be continuous or periodic, and may occur as a response to an alarm event or in connection with monitoring an auxiliary device. In some embodiments, the existence of a certain condition associated with an auxiliary device will trigger alarm event. In some embodiments, information may be transmitted from an auxiliary device to the personal emergency response system. Similarly, information may be transmitted from the personal emergency response system to an auxiliary device.

An auxiliary device may be accessible to the personal emergency response system 100 through a wireless network, with a connection directly to the personal emergency response system. Alternatively, an auxiliary device may connect direct to a subscriber device 110, with the subscriber device 110 having a connection directly to the personal emergency response system 100. In some embodiments, an auxiliary device may be connected to a subscriber device using a wireless personal area network, such as wireless USB, Bluetooth, Z-Wave, ZigBee, or other low power radio frequency connection. In alternative embodiments, an auxiliary device may be connected directly to the personal emergency response system using a mobile cellular, personal communication service, web-based wireless network, or other wireless communications technologies.

The personal emergency response system 100 may also be configured to interact with various user interfaces 124. In a preferred embodiment, the user interfaces 124 interact with the personal emergency response system 100 through the web server 106. User interfaces 124 may be configured to enable a multitude of interactions with the personal emergency response system. Through a user interface, subscribers may register and configure a subscriber device, and make changes to the configuration, and interact with subscriber settings for the personal emergency response system. These configurations and settings may be transmitted to the subscriber device through the connection between the subscriber device and the personal emergency response system, or through a wireless connection between the subscriber device and a local area network connection to the Internet.

In some embodiments, user interfaces may be configured to enable other users to interact with subscriber settings. For example, user interfaces may enable access for a subscriber's care givers, friends and family, or call center operators at a monitoring service for the personal emergency response system. In a preferred embodiment, a user interface is made available to enable control center operators, care givers, friends and family, or emergency dispatch operators, or other parties to interact with the subscriber, subscriber device, or auxiliary device in response to an alarm event. A user interface may also be configured to review data associated with a subscriber device that has been stored in the data warehouse 108. In a preferred embodiment, subscriber data may be displayed in a user interface with a "dashboard" format with options to "drill-down" to view increasingly more detailed information.

In some embodiments, a user interface may be deployed using web-based technologies. For example, a user interface may be accessible on a web page by any computing device with a web browser and an Internet connection. Alternatively, a user interface may consist of a mobile phone application, making the personal emergency response system accessible by a handheld mobile phone, tablet computer, or other wireless communications device.

In other embodiments, a user interface may utilize dual-tone multi-frequency signaling, such as touch-tone dialing to enable a party to interact with the personal emergency response system using a telephone having push-button telephone keypad functionality. Those skilled in the art will appreciate that various other multi-frequency signaling technologies or pulse dialing technologies may be employed. Alternatively, similar user interfaces may enable parties to interact with the personal emergency response system using a digital keypad, such as on a mobile phone. Various commands may be associated with certain buttons on the keypad, or users may be provided with menu options, and certain buttons on the keypad maybe used to select from among the options.

FIG. 2 shows a table detailing one embodiment of various responses to various personal emergency response system alarm events. Those skilled in the art will appreciate that numerous other embodiments, including a multitude of alternative alarm events, responses, response sequences, contact persons, and contact sequences are within the spirit and scope of the disclosure herein.

In some embodiments, responses to an alarm event include initiating a conference network, interacting with the subscriber device, interacting with an auxiliary device, recording alarm event content, and concluding the alarm event. An alarm event may be assigned one or more responses. Multiple responses to an alarm event may be carried out concurrently, or in sequence. Various responses and contact persons associated with alarm events may be designated using a user interface 124.

In some embodiments, an alarm event triggers personal emergency response system to initiate a conference network. The conference network may be initiated immediately in response to an alarm event, or the conference network may be initiated subsequent to or concurrently with other responses. As shown in the embodiment described in FIG. 2, one or more contact persons may be given notice to join the conference network. In a preferred embodiment, the one or more parties to whom notice is given to join a conference network comprise the one or more parties that are preferred to respond to the alarm event. A party may be preferred to respond to an alarm event for a variety of reasons, including the expected timeliness of a response, the ability to provide an appropriate response, a party's skills and experiences relative to the nature of the alarm event, the party's relation to the subscriber, a party's known schedule or availability, or a party's physical location relative to the subscriber. Additionally, a party may be preferred to respond to an alarm event based on the relative cost of having such party respond as compared to alternative parties. Multiple parties may be given notice to join a conference network concurrently, or in sequence. Notification sequences may include groups of parties to be notified concurrently at one or more stages in the sequence.

In a preferred embodiment, if the alarm event is an emergency, then as shown in FIG. 2, emergency dispatch is given notice to join the conference network. In a preferred embodiment, if an alarm event is not an emergency, the initial notice to join the conference network is provided to parties other than emergency dispatch operators. For example, notice could be first given to a friend or family member, or to a health care provider. Notice may be given concurrently or in sequence. In a preferred embodiment, alarm events that are associated with a low level of hazard or concern are associated with responses and contact persons that are appropriate for resounding, rather than emergency dispatch or control center operators. For example, an alarm event indicating that a subscriber needs transportation may trigger the personal emergency response system to contact a friend or family member of the subscriber. In some embodiments, where the personal emergency response system gives notice to emergency dispatch or control center operators, requesting that they join the conference network, if other notified parties do not timely join the conference network.

In some embodiments, data transmitted from the subscriber device or from an auxiliary device is made available to one or more parties. Such data may be made available to all parties that are notified to join the conference network, or to a subset of such parties. For example, data may be provided only to emergency dispatch and not to other parties. In some embodiments, a password may be required to access data. In some embodiments, different subsets of data may be available to different parties. Data that may be made available may include GPS location, direction of travel and speed, and positional orientation of the subscriber device, as well as audio feeds, video feeds, environmental information, and sensory information from the subscriber device, such as fall-sensor data. Additionally, data made available may include auxiliary device information such as medical sensor information or home automation system information. Further, data made available may include data stored in the data warehouse 108, such as the subscriber's personal information and historical data associated with the subscriber device or the subscriber. Personal information may include vital life information, insurance information, preferred medical provider, physicians, hospital information and contact information.

In some embodiments, the subscriber device may be configured to provide instructions or alerts to a subscriber, including text, color, voice or audible sound, and combinations thereof. For example, the personal emergency response system may be configured to send instructions to a subscriber in response to an alarm event. Instructions may include navigation to a waypoint, or instructions for performing personal care procedures such a taking medication or self-treating a minor ailment. In some embodiments, instructions may be automatically sent to a subscriber device in response to an alarm event. This may be advantageous for alarm events of low concern, such as if a subscriber simply forgot how to perform a simple task.

In some embodiments, a subscriber device may be equipped with a fall detection sensor or device orientation sensor. The occurrence of a detected fall or the occurrence of a horizontal position of the device may trigger an alarm event. Different alarm events may be associated with different types of detected falls or with the duration that the sensor remains in the horizontal position. For example, if a fall appears severe, the alarm event may initiate the conference network directly with emergency dispatch. Conversely, if a fall appears minor, the personal emergency response system may send an automated response requesting that the subscriber confirm that he or she is okay, and initiate the conference network absent timely confirmation from the subscriber that he or she is okay. In some embodiments, an alarm event associated with a fall sensor may trigger the personal emergency response system to give notice to a heath care provider or a family member to join the conference network, and then initiate a conference network with emergency dispatch if the health care provider or family member do not timely respond.

In some embodiments, a subscriber may trigger an alarm event if the subscriber is lost. In response, navigation to a way-point may be provided on the subscriber device. The subscriber device may be prompted to provide navigation automatically upon the occurrence of an alarm event. For example, an alarm event associated with being lost may trigger navigation instructions to be automatically sent to the subscriber device. Additionally, a party to the conference network may prompt the personal emergency response system to provide navigation instructions upon learning during the conference that the subscriber is lost. In some embodiments, an alarm event may be triggered if a subscriber device is detected to be outside of a certain region. One response to such an alarm event may be an automatic prompt, requesting that the subscriber confirm that they are not lost or that they are okay. Confirmation may conclude the alarm event, or absent confirmation, subsequent responses may be triggered, such as initiating a conference network with one or more parties. In some embodiments, various navigation waypoints may be pre-programmed using the user interface 124.

In some embodiments, navigation instructions may be simplified and condensed, such as only including a simple directional arrow and distance to a waypoint. The directional arrow may indicate turns when needed and distance to the desired waypoint. Such simplified instructions may be advantageous where the subscriber may not have cognitive abilities or resources available to comprehend more complicated navigation instructions.

In some embodiments, a subscriber device may be associated with one or more auxiliary devices. Conditions related to an auxiliary device may trigger alarm events. An alarm event may be triggered if a healthcare device transmits a measurement that falls outside of a desired range. For example, if a heart rate monitor transmits an irregular heartbeat, an alarm event may be triggered, thereby enabling timely response without the need for the subscriber to manually summon for help. Similarly, an alarm event may be triggered if a home automation device indicates that something is amiss in the home. For example, if a subscriber is locked out of the home, the subscriber may trigger an alarm event to cause a home automation system to automatically unlock the door to allow the subscriber to gain access to the home without having to directly contact a friend, neighbor, or property manager. Additionally, in some embodiments parties responding to an alarm event may interact with auxiliary devices to better enable an appropriate response. For example, a responding party may view data transmitted from auxiliary devices to help diagnose the nature of a subscriber's condition. A responding party may also transmit instructions to an auxiliary device that are responsive to an alarm event.

In some embodiments, information associated with auxiliary devices may be transmitted to the personal emergency response system and stored in the data warehouse 108, thereby enabling authorized persons to access such information as needed. Such auxiliary device information may be displayable to parties upon the occurrence of an alarm event, or alternatively may be accessible on an ad-hoc basis. Access settings may be defined via a user interface for various parties.

In some embodiments, the personal emergency response system may be configured to provide reminders to a subscriber. The reminder may comprise a visual, audio, or tactile alert. Reminders may include medicine reminders, appointment reminders, meal time reminders, and reminders of other information that a subscriber may need to recall throughout the day. Reminders may be programmed into the personal emergency response system and associated with a subscriber device by the subscriber, or by friends, family members, health care providers, control center operators, or other parties through a user interface accessible via a web browser, smart phone application or other device. In some embodiments, the reminder schedules are stored on the subscriber device such that a connection between the subscriber device and the personal emergency response system is not necessary for the reminders to be prompted on the subscriber device.

In some embodiments, a subscriber may be prompted to acknowledge that a task has been performed. The task may be derived from a reminder schedule or from a third-party such as a health care provider, physician, or family member. In some embodiments, an alarm event may be triggered absent timely confirmation that the task has been performed.

Figure 3:
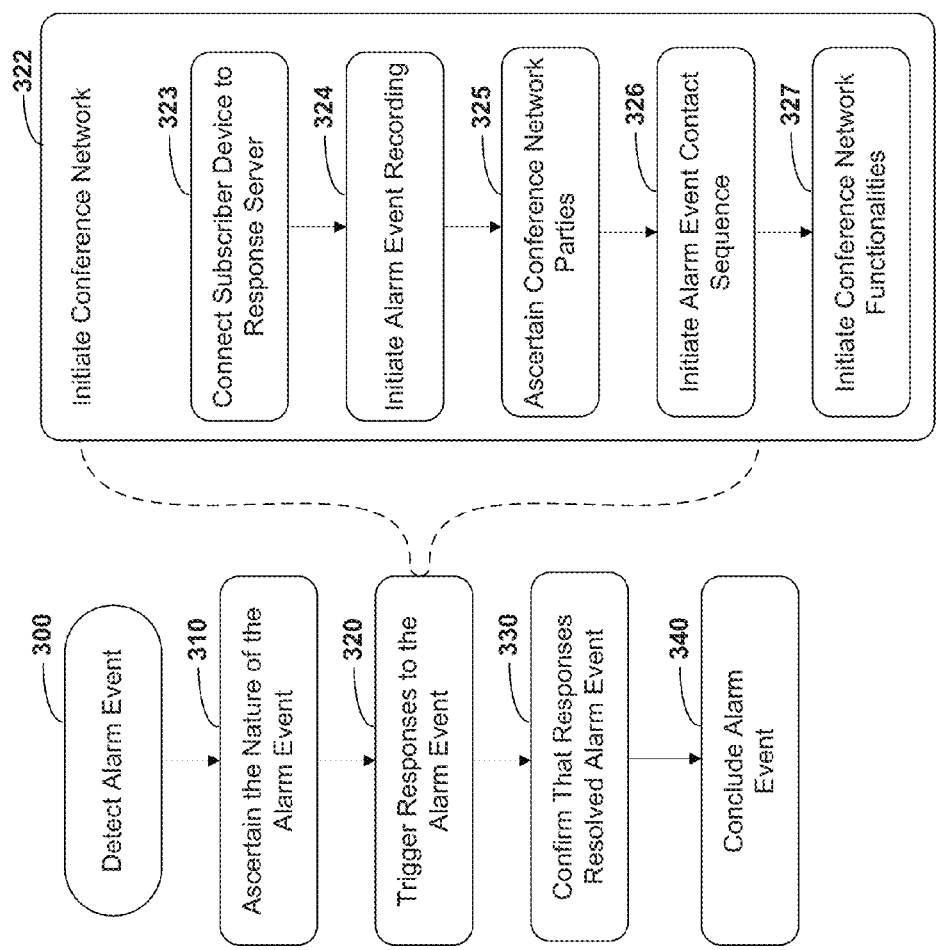
FIG. 3 shows a flow chart detailing one embodiment of a computer-implemented method for responding to a personal emergency response system alarm event.

FIG. 3 shows a flow chart detailing one embodiment of a computer-implemented method for responding to a personal emergency response system alarm event. Those skilled in the art will appreciate that numerous other embodiments of methods for responding to a personal emergency response system alarm event are within the spirit and scope of the disclosure herein.

As described in the embodiment shown in FIG. 3, upon having detected an alarm event 300, the personal emergency response system ascertains the nature of the alarm event 310, then triggers one or more response to the alarm event 320. The one or more responses may be triggered concurrently or in sequence, and may include, among other things, initiating a conference network, interacting with a subscriber device, interacting with an auxiliary device, or recording content associated with the alarm event. The embodiment described in FIG. 3 contemplates that the response to the alarm event is to initiate a conference network 322. As described in FIG. 3, the conference network may be initiated by connecting the subscriber device to the response server 323, and initiating alarm event recording 324. If the subscriber device is configured for continuous recording, the step of initiating alarm event recording 324 may be unnecessary. Next, the personal emergency response system ascertains the conference network parties 325, which are the parties to be given notice to join the conference network, and then the conference network contact sequence is initiated 326. Conference network functionalities are then initiated 327, which may comprise conference bridge commands, in-bound data commands, and out-bound data commands. Conference network functionalities may be accessible via a user interface. The interface may be a web-based interface or a telephone keypad interface such as a dual-tone multi-frequency signaling interface. After the conference network has been initiated, the embodiment described in FIG. 3 contemplates that the personal emergency response system then confirms that responses to the alarm event have resolved the alarm event 330, and if so, concludes the alarm event 340. In some embodiments, if the responses to the alarm event have not timely resolved the alarm event, the alarm event may be escalated, such as to emergency dispatch.

Figure 4:
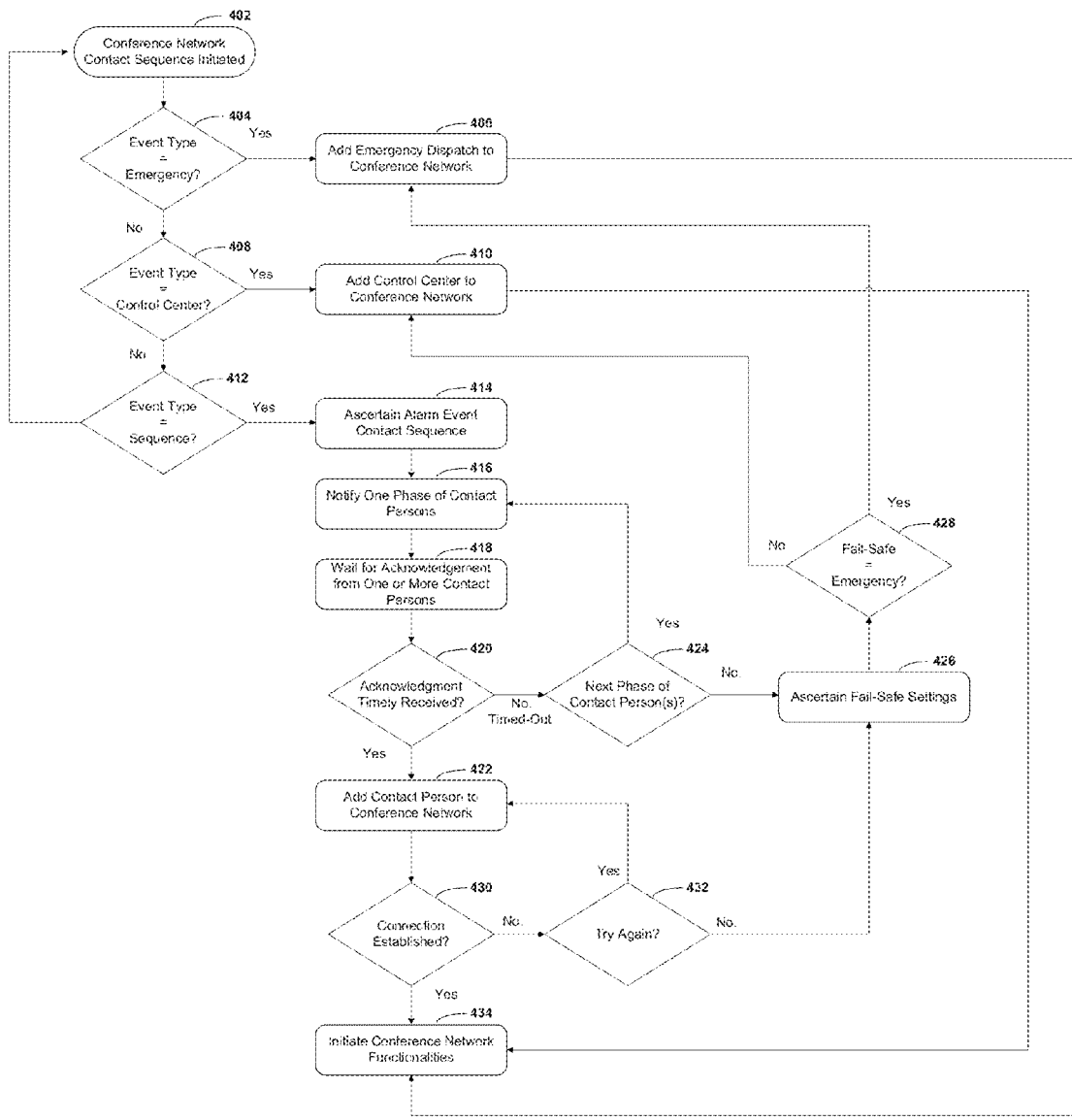
FIG. 4 shows a flow chart detailing one embodiment of a contact sequence for initiating a conference network.

FIG. 4 shows a flow chart detailing one embodiment of a contact sequence for initiating a conference network. As described in the embodiment shown in FIG. 4, upon the contact sequence having been initiated 402, if the alarm event type requires emergency dispatch 404, then emergency dispatch is added to the conference network 406. If the alarm event type requires a control center operator 408, then the control center is added to the conference network 410. If the alarm event type requires a contact sequence of one or more parties 412, then the personal emergency response system ascertains the alarm event contact sequence 414. Next, the personal emergency response system gives notice to one phase of contact persons 416, and then waits for acknowledgment from one or more contact persons 418. If acknowledgment is timely received 420, the one or more contact persons are added to the conference network 422. If acknowledgment is not timely received 420, then the personal emergency response system determines if there exists a next subsequent phase of contact persons 424, and if so, notifies such contact persons 418. This loop is repeated until one or more contact persons are added to the conference network 422, or all subsequent phases of contact persons have been exhausted.

If there are no subsequent phases of contact persons remaining to be contacted 424, then the personal emergency response system ascertains what fail-safe settings are in place 426. If the fail-safe settings provide for escalating the alarm event to emergency dispatch 428, then emergency dispatch is added to the conference network 406. Otherwise, the control center is added to the conference network 410.

When adding a party to the conference network, the personal emergency response system ascertains whether a connection has been established between the subscriber device and the party being added 430, and if so, access to the conference network functionalities is made available to such party or parties 432. If a connection between the subscriber device and the party being added has not been established, the personal emergency response system ascertains whether to attempt again to establish a connection 434, and if so, repeats the process of adding the party to the conference network 422. Otherwise, the personal emergency response system ascertains what fail-safe settings are in place 426 and proceeds appropriately.

Figure 5:
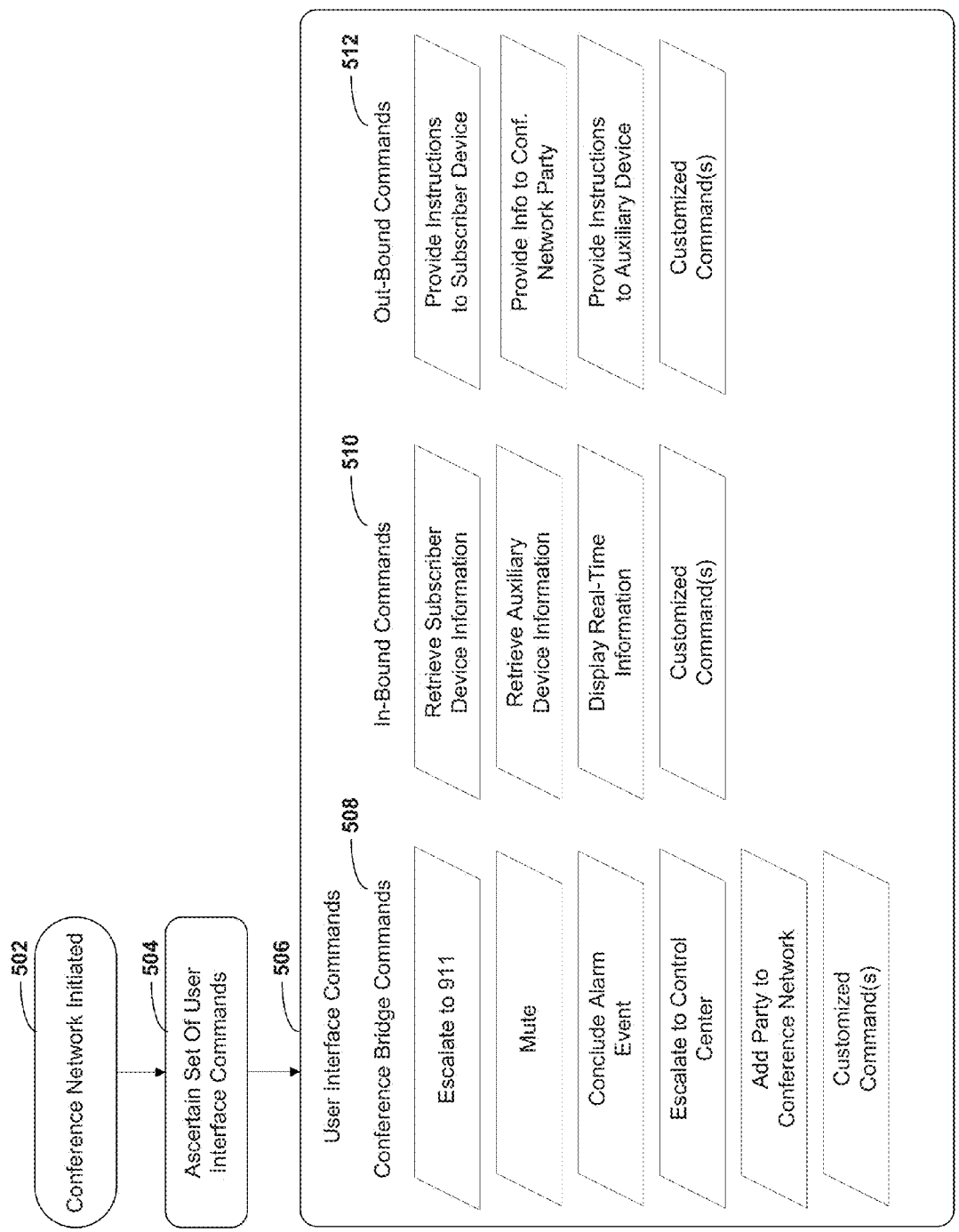
FIG. 5 shows a block diagram depicting one embodiment of user interface commands availed to users of one embodiment of a personal emergency response system.

FIG. 5 shows a block diagram depicting one embodiment of user interface commands availed to users of one embodiment of a personal emergency response system. Those skilled in the art will appreciate that numerous other embodiments of user interface commands and associated user interfaces are within the spirit and scope of the disclosure herein. FIG. 5 depicts a set of user interface commands that are made available to parties to a conference network. Upon the conference network having been initiated 502, the personal emergency response system ascertains the set of user interface commands to be made available to parties to the conference network 504, and then the appropriate set of user interface commands is made available to the parties to the conference network 506. In the embodiment described in FIG. 5, the user interface commands comprise conference bridge commands 508, in-bound commands 510, and out-bound commands 512. The conference bridge commands 508 include escalating to emergency dispatch, mute, conclude alarm event, escalate to control center, add party to conference network, and may also include one or more customized commands. The in-bound commands 510 include retrieve subscriber device information, retrieve auxiliary device information, display real-time information, and may also include one or more customized commands. The out-bound commands 512 include provide instructions to subscriber device, provide info to a conference network party, provide instructions to an auxiliary device, and may also include one or more customized commands.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting. It is intended that the scope of this disclosure be defined by the following claims and their equivalents.

What is claimed is:

1. An automated personal emergency response system comprising:
    an alarm server, the alarm server configured to detect alarm events from one or more subscriber devices, to ascertain the nature of an alarm event based on a plurality of alarm event types, and to trigger one or more responses to an alarm event, the one or more automated personal emergency responses depending on the nature of the alarm event;
    a response server, the response server configured to allow two-way communications and data transmissions among one or more parties and a subscriber device;
    a data warehouse, the data warehouse configured to store data in association with a subscriber device; and
    a user interface configured to facilitate updates to data stored in the data warehouse in association with a subscriber device, including at least assignment of contact information for particular parties in conjunction with particular alarm event types,
    wherein the automated personal emergency response system is operable to facilitate automated personal emergency responses for subscribers independently of a central monitoring station, a call center, or perpetual dedicated staffing, and
    wherein an automated personal emergency response includes at least:
        ascertaining at least one particular party from the data warehouse depending on the nature of a received alarm event;
        instructing the at least one particular party to join a conference network; and
        instructing at least one additional particular party obtained from the data warehouse to join the conference network if a preceding at least one particular party does not timely join the conference network.

2. The automated personal emergency response system of claim 1, wherein the alarm server is further configured for at least:
    ascertaining a class based on the nature of an alarm event, the class comprising one or more parties; and
    giving notice to the one or more parties, the notice comprising instructions to join a conference network.

3. The automated personal emergency response system of claim 2, wherein the notice is given in a sequence, the sequence comprising:
    notifying a first party among the class;
    subsequently notifying one or more parties among the class if the preceding one or more parties in the notice sequence do not timely join the conference network; and
    escalating the alarm event if all of the one or more parties in the class fail to timely join the conference network, the escalation comprising notifying emergency dispatch.

4. The automated personal emergency response system of claim 1, wherein the alarm server is further configured for at least:
    causing the subscriber device to provide navigation to a waypoint.

5. The automated personal emergency response system of claim 1, wherein the alarm server is further configured for at least:
    sending data to a subscriber device, the data comprising instructions to perform a task and to confirm that the task has been performed.

6. The automated personal emergency response system of claim 1, wherein the one or more responses comprise remotely interacting with an auxiliary device, the auxiliary device being accessible through a wireless network.

7. The automated personal emergency response system of claim 6, wherein the wireless network comprises a link between the auxiliary device and the subscriber device.

8. The automated personal emergency response system of claim 1, wherein instructions are transmitted to a subscriber device, and an alarm event is triggered absent timely confirmation that the instructions have been executed.

9. The automated personal emergency response system of claim 1, wherein the one or more automated personal emergency responses are performed in a sequence, the sequence depending on the nature of the alarm event.

10. The automated personal emergency response system of claim 9, wherein the sequence comprises:
    sending data to a subscriber device, the data comprising instructions to perform a task and to confirm that the task has been performed;
    absent confirmation that the task has been performed, ascertaining a class based on the nature of the alarm event, the class comprising one or more parties, and
    giving notice to the one or more parties, the notice comprising instructions to join a conference network.

11. The automated personal emergency response system of claim 1, wherein the response server is further configured to enable a party to the conference network to give notice to one or more additional parties, the notice comprising instructions to join the conference network.

12. The automated personal emergency response system of claim 1, wherein the response server is further configured to enable a party to the conference network to remotely interact with an auxiliary device, the auxiliary device being accessible through a wireless network comprising a link between the auxiliary device and the subscriber device.

13. The automated personal emergency response system of claim 1, wherein one or more auxiliary devices are accessible through a wireless network, and certain events associated with an auxiliary device will trigger an alarm event.

* * * * *